United States Patent Office 3,387,597
Patented June 11, 1968

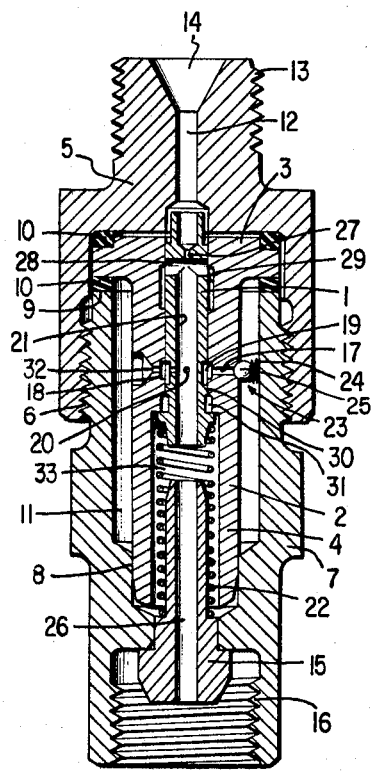

3,387,597
**INJECTION ENGINE WITH CONTROLLED
PRE-INJECTION**
Robert J. Wirsching, Korntal, Wurttemberg, Germany, assignor to Daimler-Benz Aktiengesellschaft, Stuttgart-Unterturkheim, Germany
Filed Mar. 21, 1966, Ser. No. 535,954
Claims priority, application Germany, Mar. 25, 1965,
D 46,894
21 Claims. (Cl. 123—32)

ABSTRACT OF THE DISCLOSURE

A device for controlling the pre-injection of fuel in internal combustion engines, especially Diesel engines, wherein a piston control valve is interconnected in the fuel line between the injection pump and the injection nozzle for controlling the pre-injection of fuel by means of an intermediate relief discharge effected by a connection of the outlet work space of the piston control valve with a closed fuel storage space concentrically arranged with respect to the piston.

Background of the invention

Pre-injection of fuel is applied ever more frequently with internal combustion engines having fuel injection, above all in order to assure a good output, a good efficiency, a smooth operation, and a completely satisfactory idling. For purposes of initiating the combustion, only so much fuel is injected during the pre-injection that the fuel is ignited but that no strong pressure increase results therefrom in the combustion space. The pressure in the combustion space thereby increases gradually and suddenly. The injection process of the main fuel quantity is thereby matched to the desired combustion law.

For the realization of the pre-injection, injection pumps are known in the prior art which, equipped with special pump elements, bring about an intermediate relief operation in the injection process. A subdivision of the injection operation into the pre-injection and main injection results from the intermediate relief operation. It is thereby of disadvantage that falsifications and errors, especially by pressure fluctuations in the fuel, may occur in the injection operation by reason of the relatively long path which the fuel has to traverse from the injection pump to the injection nozzle.

It has already been proposed heretofore to interconnect between a conventional injection pump and an injection nozzle a device having a control piston effecting the intermediate relief which is moved in one direction by the supply pulse of the injection pump and moved in the opposite direction by means of a spring force and/or the fuel supply pressure. As a result of such an arrangement, a completely predetermined fuel volume dependent on the dimensions of the control device is injected during each injection pulse and thereafter an injection pause lasting up to the beginning of the main injection is maintained which is dependent from an also equally predetermined fuel volume lead off into an intermediate relief line. The intermediate relief line leads to a fuel tank.

Summary of the invention

The present invention is predicated on the task to constitute the previously proposed installation still more favorable and more effective.

The solution to the underlying problems is realized in accordance with the present invention with an injection-type engine having a piston control valve interconnected in the fuel line between the injection pump and the injection nozzle for controlling the pre-injection of fuel by means of an intermediate relief discharge in that the intermediate relief is effected by a connection of the outlet work space of the piston control valve with a closed fuel storage space. The fuel storage space is arranged in an advantageous manner directly at the control valve.

From the use of such an arrangement, result in particular the advantages that the intermediate relief line present in the constructions proposed heretofore may be dispensed with and that a filling of the outlet work space of the piston control valve at the outlet side takes place in the course of the return movement of the control piston additionally as also from the fuel storage space.

The connection of the outlet work space of the piston control valve with the fuel storage space is established in an advantageous manner by a cooperation of at least one aperture or passage leading to the fuel storage space and arranged in the cylinder wall of the control valve, by a channel also arranged in the cylinder wall of the control valve and leading to the outlet work space of the control valve and by an annular groove provided at the control piston. When the control piston is displaced in the flow direction of the fuel by means of the fuel, the outlet work space of the control valve is connected with the storage space during a span of time predetermined by the construction of the flow aperture in the cylinder wall, the channel and the annular groove. The pressures prevailing within these spaces bring about that the fuel flows from one space into the other. When the control piston is moved in the direction toward the injection nozzle by the supply pulse of the injection pump, the pressure in the outlet work space of the control valve increases and a connection of the work space with the storage space effects that the fuel flows into the storage space. If, in contradistinction thereto, the control piston, for example, by means of a spring pressure, is moved in the direction toward the injection pump, then the pressure in the outlet work space of the control valve drops and a communication of this work space with the storage space effects that the fuel flows out of the storage space back into the work space.

In order that the return flow of the fuel out of the storage space into the work space does not take place too suddenly which might cause a possible after-injection, the main apertures are equipped each with a check valve and the return flow of the fuel takes place by way of at least one throttle aperture, open at all times, which is accommodated in one or each of the check valves or in the cylinder wall of the control valve.

The inlets of the apertures may be arranged in an annular groove provided in the cylinder wall of the control valve.

Preferably, the fuel storage space coaxially surrounds the cylinder of the control valve.

The volume of the outlet work space of the control piston valve and of the fuel storage space are matched to one another.

Accordingly, it is an object of the present invention to provide an injection system for an injection-type engine having an improved controlled, pre-injection and therewith an improved operation thereof.

Another object of the present invention resides in a control device for controlling the pre-injection of an injection-type internal combustion engine which is simple in construction, requires relatively few parts, and may be manufactured and assembled in a relatively inexpensive manner.

A further object of the present invention resides in a control device for fuel-injection systems of engines which assures proper pre- and main injections together with accurately predetermined pauses therebetween without danger of falsification as a result of external and/or internal influences.

Still another object of the present invention resides in an injection control system for fuel-injection engines which assures accurately controlled pauses between pre- and main injections, yet obviates the need of special relief lines and prevents any undesired after injection.

*Brief description of the drawing*

These and further objects, features, and advantages of the present invention will become more obvious from the following description when taken in connection with the accompanying drawing, which shows, for purposes of illustration only, one embodiment in accordance with the present invention, and wherein:

The single figure is an axial, longitudinal, cross-sectional view through a control device for controlling the pre-injection in accordance with the present invention.

*Detailed description of the drawing*

Referring now to the single figure of the drawing, the device for controlling the pre-injection essentially consists of a hollow control piston 1 which slides within the cylinder 2. The cylinder 2 is provided, as seen in the drawing, with a flange-like extension 3 at the upper end thereof and with a cylindrical extension 4 at the lower end thereof which is provided with a larger inner diameter. The cylinder 2 is secured within the support part 7 by means of a connecting part 5 provided with an internally threaded portion 6. The internally threaded portion 6 of the connecting part 5 engages with the external threads of the support part 7 and upon tightening thereby presses the cylindrical extension 4 of the cylinder 2 into an aperture or recess 8 of the support part 7 and the flange-like extension 3 against the upper end surface 9 of the support part 7. A safe sealing takes place at both contact surfaces between the cylinder 2 and the support part 7 which is further assisted at the upper end surfaces 9 by inserted sealing rings 10. A sealed fuel storage space 11 is thereby formed between the outer wall of the cylinder 2 and the inner wall of the support part 7.

The connecting part 5 is provided with an axial bore 12 and has approximately the shape of a cap-nut having an extension provided with an external thread 13 and a funnel-shaped aperture 14 for the connection of the fuel line coming from the fuel pump. The connection to the fuel line takes place in a known manner by means of a screw or clamping nut and a sealing cone. The support part 7 securely retains at its lower end, by any conventional means, an insert member 15 provided with an axial bore 26 which serves as abutment for the control piston 1 in its downward movement and as sealing cone in the connection of the device with the injection nozzle by means of the threads 16.

The fuel storage space 11 is connected with an annular space by way of the main apertures 17 arranged in the wall of the cylinder 2. The annular space is constituted by annular grooves 18 and 19 accommodated in the inner cylinder wall and the outer piston wall, when the control piston 1 assumes the normal rest position as illustrated in the drawing. The annular groove 19 in piston 1 is connected with the internal space 21 of the hollow conrtol piston 1 by way of throttling bores 20 in the control piston wall. The control piston 1 is normally forced into its rest position by the coil spring 22. The apertures 17 in the cylinder wall are provided with check valves 23 which block the fuel return flow from the storage space 11.

The check valve 23 is constituted in a simple manner by a ball 25 which is under the pressure of the spring 24. The return flow of the fuel out of the storage space 11 takes place by way of at least one separate throttle bore 32 provided in the wall of the cylinder 2.

The bottom of the control piston 1 is provided with a throttle bore 27 which connects the interior space of the piston with the inlet work space of the control valve. Additionally, a cross bore 28 is accommodated below the piston bottom which, with the piston in a certain position, connects the supply bore 12 with the interior space 21 of the piston by way of the further annular groove 29 also accommodated in the cylinder wall.

*Operation*

The operation of the piston control valve in accordance with the present invention is as follows:

In its normal rest position, the control piston 1 assumes the position illustrated in the figure. The fuel pressure within the spaces above and below the control piston bottom and in the fuel storage space 11 is equalized as all of these spaces are in communication by throttled connections and the coil spring 22 forces the control piston 1 into the illustrated position. As a result of a supply pulse from the injection pump, the control piston 1 is displaced in the flow direction of the fuel. A pressure increase takes place within the outlet work space 33 of the control valve at the outlet side between the piston bottom and the injection nozzle (not shown) and the injection operation commences. This injection of fuel is interrupted by an intermediate relief or discharge of the fuel pressure, and more particularly this takes place when the annular groove 19 in piston 1 bridges the cylinder section 30 left in the cylinder 2 between annular grooves 18 and 31 and thereby connects the outlet work space 33 of the control valve by way of a channel 31, which, in the illustrated embodiment, is constituted by an annular groove, with the annular groove 18 and therewith by way of the apertures 17 with the fuel storage space 11. The fuel then flows out of the outlet work space 33 of the control valve which is under high pressure, into the fuel storage space 11 for such length of time until this bridging by the overlap of the upper edge of the annular groove 19 in piston 1 with the upper edge of the cylindrical section 30 is eliminated. The injection is thereafter continued and more particularly initially by the further movement of the control piston 1 in the flow direction of the fuel and thereupon by a short-circuit-like connection of the outlet work space 33 of the control valve with the inlet bore 12. This last-mentioned connection results from the fact that the piston bottom drops below the upper edge of the annular groove 29 and the fuel now flows from bore 12 through the annular groove 29 and the cross bore 28 in by-passing relationship of the throttle bore 27 and by way of bore 21 into the outlet work space 33 of the control valve and from there to the injection nozzle. The lower dead-center position of the control valve 1 is determined by the abutment part 15.

During the return movement of the piston 1, the outlet work space 33 of the control valve 1 is again connected for a predetermined time with the fuel storage space 11 by way of the annular grooves 18 and 19 and the apertures 17. However, the check valves 23 prevent that the fuel which is under high pressure in the fuel storage space 11 now flows back suddenly into the outlet work space 33 of the control valve within which now prevails a lower pressure. However, the throttle bore 32 permits a gradual return flow of the fuel so that the outlet work space 33 of the control valve is again refilled. This refilling of the outlet work space 33 of the control valve from the fuel storage space 11 also aids the filling of the outlet work space 33 of the control valve by way of the throttle bore 27 from the fuel supply line.

While I have shown and described one embodiment in accordance with the present invention, it is understood that the same is not limited thereto but is susceptible of numerous changes and modifications as known to a person skilled in the art. For example, in the illustrated embodiment, a device for controlling the pre-injection is illustrated which may be installed subsequently between the injection pump and the injection nozzle; however, the injection nozzle may also be coupled directly with the control device of the present invention without any difficulty in that the support 7 is constructed at its lower end as nozzle support.

Thus, it is obvious that the present invention is not limited to the details shown and described herein and I therefore do not wish to be limited to the details shown and described herein but intend to cover all such changes and modifications as are encompassed by the scope of the appended claims.

I claim:

1. In an injection engine having an injection pump and an injection nozzle, the improvement comprising a piston control valve assembly adapted to be operatively connected between the injection pump and the injection nozzle for controlling the pre-injection of fuel by an intermediate relief action, said piston control valve assembly including cylinder means, control piston means in said cylinder means, an outlet work space being provided at the outlet side of the assembly, means forming a substantially closed fuel storage space, said control piston means being displaced in one direction by the supply pulse from the injection pump and being forced back into its normal rest position upon completion of the injection operation, and further means for effecting an intermediate relieving action by operatively connecting the outlet work space with said fuel storage space.

2. The combination according to claim 1, wherein the fuel storage space is arranged at the control valve assembly.

3. The combination according to claim 2, wherein the connection of said outlet work space with the fuel storage space formed by said further means is established by the cooperation of at least one main passage means leading to the fuel storage space and arranged in the cylinder wall of the control valve assembly, by a channel means also arranged in the cylinder wall of the control valve assembly and leading to said outlet work space and by an annular groove means provided at the control piston means.

4. The combination according to claim 3, further comprising check valve means for each main passage means, and at least one throttle bore means provided in addition to said main passage means within the cylinder wall of the control valve assembly, said throttle bore means enabling a return flow of the fuel out of the fuel storage space into said outlet work space even with a closed main passage means.

5. The combination according to claim 4, wherein each main passage means equipped with check valve means is provided with at least one continuously open throttle bore.

6. The combination according to claim 5, wherein the inlets to the main passage means are provided in an annular groove accommodated in the cylinder wall of the control valve assembly.

7. The combination according to claim 6, wherein said fuel storage space coaxially surrounds the cylinder means of the control valve assembly.

8. The combination according to claim 1, wherein the connection of said outlet work space with the fuel storage space formed by said further means is established by the cooperation of at least one main passage means leading to the fuel storage space and arranged in the cylinder wall of the control valve assembly, by a channel means also arranged in the cylinder wall of the control valve assembly and leading to said outlet work space and by an annular groove means provided at the control piston means.

9. The combination according to claim 8, further comprising check valve means for each main passage means, and at least one throttle bore means provided in addition to said main passage means within the cylinder wall of the control valve assembly, said throttle bore means enabling a return flow of the fuel out of the fuel storage space into said outlet work space even with a closed main passage means.

10. The combination according to claim 9, wherein each main passage means equipped with check valve means is provided with at least one continuously open throttle bore.

11. The combination according to claim 1, wherein the inlets to the main passage means are provided in an annular groove accommodated in the cylinder wall of the control valve assembly.

12. The combination according to claim 11, wherein said fuel storage space coaxially surrounds the cylinder means of the control valve assembly.

13. The combination according to claim 1, wherein said fuel storage space coaxially surrounds the cylinder means of the control valve assembly.

14. The combination according to claim 1, wherein each main passage means is equipped with check valve means and is provided with at least one continuously open throttle bore.

15. An injection engine, comprising injection pump means, injection nozzle means, fuel line means between said pump and nozzle means including control valve means for controlling the pre-injection of fuel by an intermediate relief, said control valve means including cylinder means, control piston means in said cylinder means, outlet work space means, substantially closed fuel storage space means, and means for terminating a pre-injection and providing a predetermined pause up to the beginning of the main injection by effecting an intermediate relief including connecting means operatively connecting said work space means with said fuel storage space means.

16. The combination according to claim 15, wherein said piston means is displaced by the injection impulse from said pump means and further comprising spring means for returning said piston means to its normal position.

17. The combination according to claim 15, wherein said piston means is displaced by the injection impulse from said pump means, and further comprising means for returning the piston means to its normal rest position by the fuel supply pressure.

18. The combination according to claim 15, wherein said piston means is displaced by the injection impulse from said pump means and further comprising means including spring means for returning said piston means to its normal position by the combined spring force and fuel supply pressure.

19. The combination according to claim 15, wherein the fuel storage space means is contained within the control valve means.

20. The combination according to claim 15, wherein said connecting means includes cooperating main aperture means leading to the fuel storage space means and arranged in the cylinder means, channel means also arranged in the cylinder means and leading to said work space means, and annular groove means provided at the piston means.

21. The combination according to claim 20, wherein each main aperture means includes check valve means, and throttle bore means provided in addition to said main aperture means within the cylinder means, said throttle bore means enabling a return flow of the fuel out of the fuel storage space means into said work space means with closed main aperture means.

References Cited

UNITED STATES PATENTS 2,090,350  8/1937  Heinrich et al. __ 123—139 XR

FOREIGN PATENTS 810,456  3/1959  Great Britain.

LAURENCE M. GOODRIDGE, *Primary Examiner.*